(12) United States Patent
Tobin et al.

(10) Patent No.: US 10,609,221 B2
(45) Date of Patent: *Mar. 31, 2020

(54) SYSTEM FOR PROCESSING VOICE RESPONSES USING A NATURAL LANGUAGE PROCESSING ENGINE

(71) Applicant: Bank of America Corporation, Charlotte, NC (US)

(72) Inventors: Kyle A. Tobin, Middletown, DE (US); Robert E. Lutzkow, Jr., Lopatcong, NJ (US); Robert S. Morse, Lexington, MA (US); Jitendra Kumar Padam, Renton, WA (US); Scott Steven Randrup, Sammamish, WA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/679,954

(22) Filed: Nov. 11, 2019

(65) Prior Publication Data

US 2020/0076949 A1    Mar. 5, 2020

Related U.S. Application Data

(63) Continuation of application No. 16/035,266, filed on Jul. 13, 2018, now Pat. No. 10,477,028.

(51) Int. Cl.
| | |
|---|---|
| *H04M 3/527* | (2006.01) |
| *G10L 15/14* | (2006.01) |
| *G10L 15/197* | (2013.01) |
| *G10L 15/22* | (2006.01) |
| *G06F 16/632* | (2019.01) |

(52) U.S. Cl.
CPC .......... *H04M 3/527* (2013.01); *G06F 16/632* (2019.01); *G10L 15/14* (2013.01); *G10L 15/197* (2013.01); *G10L 15/22* (2013.01); *G10L 2015/223* (2013.01)

(58) Field of Classification Search
CPC ...... H04M 3/527; G06F 16/632; G10L 15/14; G10L 15/197; G10L 15/22
See application file for complete search history.

(56) References Cited

U.S. PATENT DOCUMENTS

| | | | |
|---|---|---|---|
| 6,094,635 | A | 7/2000 | Scholz et al. |
| 6,839,896 | B2 | 1/2005 | Coffman et al. |
| 7,634,406 | B2 | 12/2009 | Li et al. |

(Continued)

*Primary Examiner* — Mohammad K Islam
(74) *Attorney, Agent, or Firm* — Michael A. Springs

(57) ABSTRACT

A system for processing voice responses is disclosed. The system is configured to store a correlation table identifying relationships between self-service routines, tags, and corresponding actions. The system receives a call from a user and issues a query in response to the call. The system receives an utterance from the user in response to the user and determines whether the utterance matches a pre-defined response. If there is no match, the system analyzes the utterance with a pre-defined statistical language model and identifies a service tag for the utterance. The system then associates the utterance with the service tag and a self-service routine that is associated with the call. The system identifies an action from the correlation table that correlates to the service tag and the self-service routine.

20 Claims, 3 Drawing Sheets

(56) References Cited

U.S. PATENT DOCUMENTS

| | | | |
|---|---|---|---|
| 7,647,225 B2* | 1/2010 | Bennett | G10L 15/005 |
| | | | 704/251 |
| 7,933,399 B2* | 4/2011 | Knott | H04M 3/493 |
| | | | 379/211.02 |
| 7,983,401 B1* | 7/2011 | Krinsky | H04M 3/527 |
| | | | 379/88.23 |
| 8,260,619 B1 | 9/2012 | Bansal et al. | |
| 8,675,842 B2* | 3/2014 | Franklin-Barr | H04M 1/64 |
| | | | 379/100.03 |
| 8,738,384 B1 | 5/2014 | Bansal et al. | |
| 9,009,046 B1 | 4/2015 | Stewart | |
| 9,105,268 B2 | 8/2015 | Srivastava et al. | |
| 10,063,701 B2* | 8/2018 | Kumar | G10L 15/22 |
| 10,154,144 B2* | 12/2018 | Casasola | H04M 3/527 |
| 10,191,987 B2* | 1/2019 | Hart | G06F 16/951 |
| 2003/0026409 A1* | 2/2003 | Bushey | H04M 3/493 |
| | | | 379/211.02 |
| 2004/0098253 A1 | 5/2004 | Balentine et al. | |
| 2009/0037382 A1* | 2/2009 | Ansari | H04L 41/12 |
| 2010/0114564 A1* | 5/2010 | Kesireddy | H04M 3/4936 |
| | | | 704/10 |
| 2013/0163746 A1* | 6/2013 | Wick | H04M 3/5166 |
| | | | 379/265.14 |
| 2014/0214541 A1* | 7/2014 | Pasila | G06Q 30/0267 |
| | | | 705/14.55 |
| 2016/0337516 A1* | 11/2016 | Runyan | H04M 3/4935 |
| 2017/0061443 A1* | 3/2017 | Wolf | G06Q 30/016 |
| 2017/0318156 A1* | 11/2017 | Bao | H04M 3/527 |
| 2018/0020093 A1* | 1/2018 | Bentitou | H04M 3/4365 |
| 2018/0068031 A1* | 3/2018 | Hewavitharana | G06N 3/006 |
| 2019/0082043 A1* | 3/2019 | Lavian | H04M 1/2473 |
| 2019/0251959 A1* | 8/2019 | Engles | H04M 3/523 |

* cited by examiner

SYSTEM FOR PROCESSING VOICE RESPONSES USING A NATURAL LANGUAGE PROCESSING ENGINE

CROSS-REFERENCE TO RELATED APPLICATIONS

This application is a continuation of U.S. patent application Ser. No. 16/035,266 filed Jul. 13, 2018, by Kyle A. Tobin et al., and entitled "A SYSTEM FOR PROCESSING VOICE RESPONSES USING A NATURAL LANGUAGE PROCESSING ENGINE," which is incorporated herein by reference.

TECHNICAL FIELD

This disclosure relates generally to processing voice responses, and more particularly to a system for processing voice responses using a natural language processing engine.

BACKGROUND

Call centers may receive a significant number of calls for requesting various services on a daily basis. For example, the calls may include various service requests comprising voice requests and responses. Conventional systems have proven inefficient in processing these service requests. For example, call centers try to use interactive voice response (IVR) to handle a large volume of calls. The large volume of calls puts a significant strain on the computing and network resources of the call center. Traditional IVR systems cannot handle/process words and phrases that do not match predetermined responses. This causes the call center to expend significantly more computing/networking resources to process the call. This creates bottlenecks and inefficiencies in the use of computing/networking resources. As another example, traditional IVR systems may misroute calls to wrong recipients, which causes significant computing/networking resources to be wasted on transmitting and processing the misrouted calls.

SUMMARY

Call centers may receive a significant number of calls for requesting various services on a daily basis. For example, the calls may include various service requests comprising voice requests and responses. Typically, a call center may receive a call from a user to request a service, such as for example, checking recent activity for an account. In response to the call, the call center may play (e.g., speak) the most recent account activities to the user. The call center may further send a query asking the user for subsequent instructions, such as for example, "what would you like to do next?" The call center may also provide a few pre-defined responses to the user, such as for example, "you can say 1. repeat, 2. new search, or 3. main menu." The user may respond to the query with an utterance (e.g., a sentence). If the user says something that matches any one of the pre-defined responses, the call center will perform an action corresponding to the matching response. For example, if the user says "repeat," the call center will replay the most recent account activities to the user. If the user says something that does not match any one of the pre-defined responses, for example if the user says "I want to check my account balance," the call center employing conventional systems may not understand and say "Sorry, I don't understand. Please say repeat or press one, new search or press two, main menu or press three." Then, the user responds with another utterance that matches one of the pre-defined responses in order to proceed with the conversation with the call center.

However, such a conversation between the user and the call center uses extra network resources (e.g., network bandwidth) for the call center to request the user to provide one of the pre-defined responses and for the user to respond with another utterance that matches one of the pre-defined responses. This may create a strain in the network and further result in a network bottleneck.

The present disclosure presents a system and a method that process/analyze the voice response from the users even when the voice response does not match any one of the pre-defined responses. In this way, significant computing/networking resources will be saved from requesting the user to send a voice response that matches a pre-defined response. Furthermore, the system and method disclosed in the present closure is able to process/handle words and phrases that traditional systems cannot handle. In this way, calls received will be better understood and routed to the right recipient or provided with a proper action/service accordingly. This will save the computing/networking resources that would otherwise be used for processing misrouted calls.

The present disclosure presents a system that solves the above-described network issue with the conventional systems. In some embodiments, the system pre-stores a correlation table that includes a set of self-service routines, a set of service tags, and a set of corresponding actions. A self-service routine is generally used as a descriptor to identify what a call from a user is for or what a self-service request in the call is. A service tag is generally a descriptor to describe a service requested in an utterance that is provided by the user in response to a query from the system. Each action corresponds to a pair of a service routine and a service tag. The system also stores a set of pre-defined responses associated with the set of self-service routines. Each self-service routine is associated with a subset of the pre-defined responses.

At some point the system receives a call from a user. The call may identify a self-service request associated with a self-service routine. The system then associates the call with the self-service routine. In response to the call associated with the self-service routine, the system sends a query to the user to request further instructions. In response to the query, the user sends an utterance to system. The system receives the utterance and compares it to a set of pre-defined responses to see if there is a match. If the utterance does not match any one of the pre-defined responses, the system determines an occurrence of a failure state and proceeds to determine a meaning of the utterance using a natural language processing technique. Specifically, for example, the system analyzes the utterance with a pre-defined statistical language model. Using the pre-defined language model, the system analyzes the language structure of the utterance and identifies one or more keywords of the utterance. After identifying keywords, the system generates a service tag for the utterance based on the keywords. A service tag is generally a descriptor to describe a service requested in the utterance. The system further associates the utterance with the service tag.

Note that the system previously associated the call with the self-service routine. Since the utterance occurs within a context of the call, the system also associates the utterance with the self-service routine. Therefore, now, the utterance is associated with both the self-service routine and the service tag. The system then uses this association between the utterance, the self-service routine, and the service tag to identify a corresponding action in response to the utterance. Specifically, the system uses the pre-stored correlation table to identify an action corresponding to the self-service routine and the service tag associated with the utterance. Within the correlation table, the system identifies a self-service routine and a service tag that are associated with the utterance and then identifies an action that corresponds to the self-service routine and the service tag.

The system provides a technical solution to addressing the network problem as noted before. For example, when encountering a no-match situation for the pre-defined responses, instead of asking the user to provide another utterance or response that matches one of the pre-defined responses, the system as disclosed in the present disclosure takes the user's response (e.g., the utterance) and analyzes it using a pre-defined statistical language model. With the statistical language model, the disclosed system can analyze the language structure and grammar of the user's response to extract a few keywords. Based on the keywords, the system can understand what the user wants to do and identify an action (e.g., an operation, a service) in response to the user's response. In this way, the disclosed system provides an efficient way to interpreting a users' responses and providing an action accordingly as opposed to repeatedly asking the users to provide a response that must match a pre-defined response. This helps conserve extra network resources (e.g., network bandwidth) that would otherwise be used for the system to request the user to provide one of the pre-defined responses and for the user to respond with something that matches one of the pre-defined responses. Therefore, the disclosed system facilitates reducing the strain in the network and removing the network bottleneck.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which.

DETAILED DESCRIPTION

Figure 1:
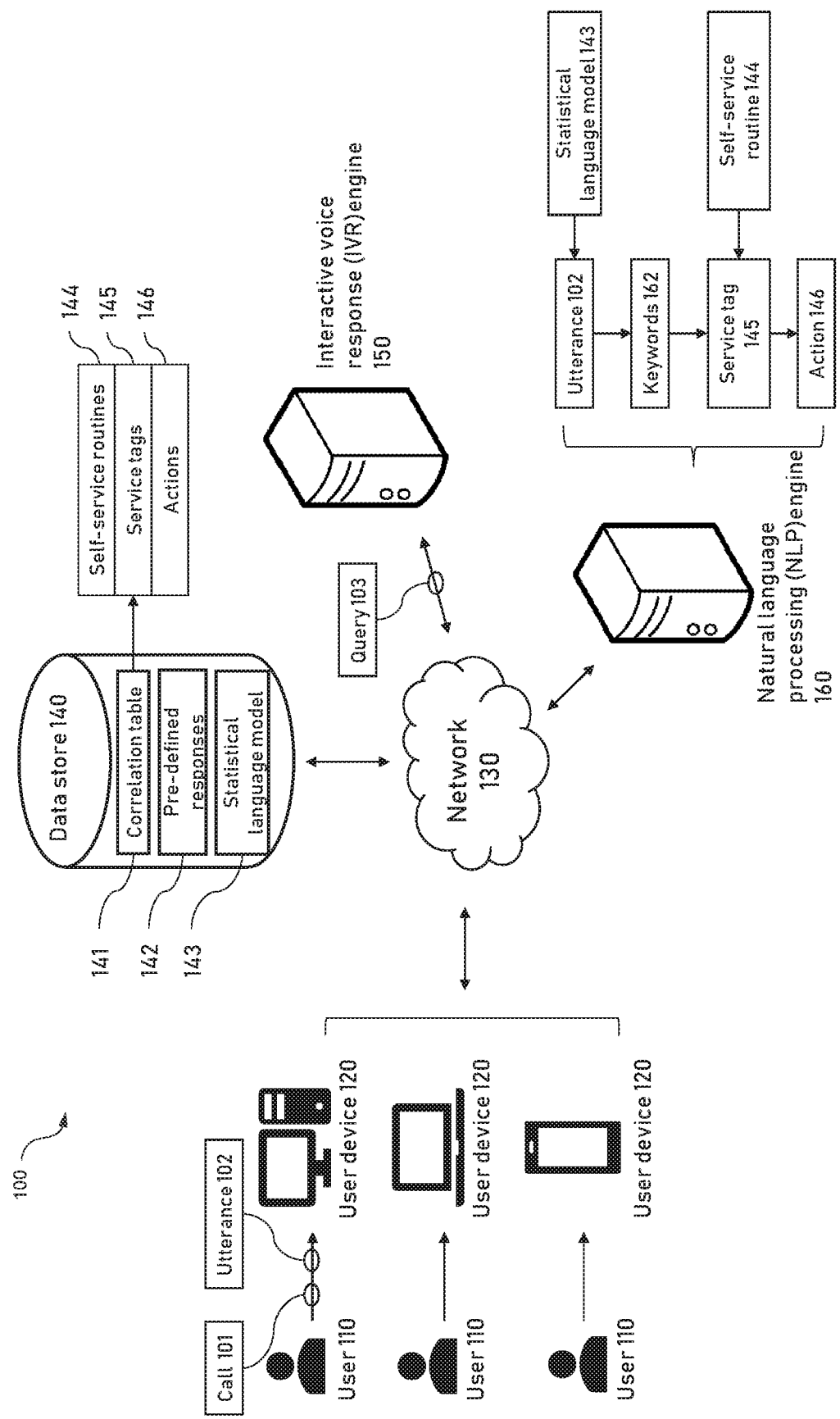
FIG. 1 illustrates an exemplary embodiment of a system for processing voice responses, according to the present disclosure.

FIG. 1 illustrates an exemplary embodiment of a system 100 for processing voice responses, according to certain embodiments of the present disclosure. System 100 includes one or more user devices 120, a network 130, a data store 140, an interactive voice response (IVR) engine 150, and a natural language processing (NLP) engine 160.

In general, system 100 receives a call 101 for requesting a self-service and processes the call 101 to determine an action 146 in response to the call 101. For example, IVR engine 150 of system 100 may receive a call 101 from a user 110 operating on a user device 120. The call 101 may include a self-service request associated with a self-service routine 144, such as for example, for requesting recent activities for an account associated with the user 110. System 100 then associates the call 101 with the self-service routine 144, such as for example, "recent activity." Self-service routine 144 is generally used as a descriptor to identify what the call 101 is for or what the self-service request of the call 101 is. In response to the call 101 associated with the self-service routine 144 "recent activity," system 100 may play (e.g., show or speak) the most recent five transactions associated with the account to the user 110.

System 100 further sends a query prompt 103 to user 110 to request subsequent instructions. For example, IVR engine 150 of system 100 may send a query 103 to user 110 asking "What do you want to do next?" In response to the query 103, user 110 may send an utterance 102 to system 100. In one example, the utterance 102 may include a sentence saying "repeat" indicating that the user 110 wants to hear the recent activities again. As another example, the utterance 102 may include a sentence saying, "I want to check my account balance." Then, IVR engine 150 compares the utterance 102 to a set of pre-defined responses 142 to see if there is a match. For example, the set of pre-defined responses 142 may include the following options: "1. repeat," "2. new search," and "3. main menu." If the utterance 102 matches one of the pre-defined responses 142, system 100 performs an action corresponding to the matching pre-defined response 142. For example, if the utterance 102 is "repeat" and system 100 determines that it matches one of the pre-defined responses 142, system 100 plays the most recent five transaction again to user 110. If the utterance 102 does not match any one of the pre-defined responses 142, system 100 determines an occurrence of a failure state and proceeds to determine a meaning of the utterance 102. For example, if the utterance 102 is "I want to check my account balance" and system 100 determines that it does not match any one of the pre-defined responses 142, system 100 then uses the NLP engine 160 to analyze the utterance 102.

Traditional systems cannot handle/process words and phrases that do not match pre-defined responses. Traditional system may not know or misunderstand the meaning of the voice response from the user. Therefore, traditional systems may misroute calls to wrong recipients or perform wrong actions or provide wrong services, which causes significant computing/networking resources to be wasted on transmitting and processing the misrouted calls. This causes the call center to expend significantly more computing/networking resources to process the calls, thereby creating bottlenecks and inefficiencies in the use of computing/networking resources.

NLP engine 160 of system 100 analyzes the utterance 102 with a pre-defined statistical language model 143. Using the pre-defined statistical language model 143, system 100 may analyze the language structure of the utterance 102 and identify one or more keywords 162 of the utterance 102. For example, for the utterance 102 "I want to check my account balance," NLP engine 160 may identify keywords 162 including a verb and infinitive combination of "want" and "to check" and an object "account balance." After identifying keywords 162, system 100 generates a service tag 145 for the utterance 102 based on the keywords 162. Service tag 145 is generally a descriptor to describe a service requested in utterance 102. Continuing with the above example, for the utterance 102 "I want to check my account balance," system 100 identifies keywords 162 "want," "to check," and "account balance" and generates a service tag 145 "balance" for utterance 102 based on the keywords 162. System 100 further associates the utterance 102 with the service tag 145 "balance."

As noted before, system 100 previously associated the call 101 with a self-service routine 144, such as for example, "recent activity." Since utterance 102 is communicated within a context of the call 101, system 100 also associates the utterance 102 with the self-service routine 144 "recent activity." Now, the utterance 102 is associated with both the self-service routine 144 "recent activity" and the service tag 145 "balance." System 100 then uses such association between the utterance 102, the self-service routine 144, and the service tag 145 to identify a corresponding action 146 in response to the utterance 102.

In order to identify an action 146 in response to the utterance 102, system 100 uses a correlation table 141 that is pre-stored in data store 140. Correlation table 142 is generally configured to store a correlation between a set of self-service routines 144, and a set of service tags 145, and a set of corresponding actions 146. For example, each action 146 corresponds to a pair of a self-service routine 144 and a service tag 145. Note that a service tag 145 may lead to different actions 146 when correlating with different service routines 144. For example, a service tag 145 correlating with a first self-service routine 144 may lead to a first action 146, while the service tag 145 correlating with a second self-service routine 144 may lead to a second action 146 that is different from the first action 146. This means that system 100 may identify different actions 146 in response to an utterance 102 having a service tag 145 within calls 101 associated with different self-service routines 144.

For example, an utterance 102 "I want to check my account balance" having the service tag 145 "balance" occurring within a first call 101 associated with a first self-service routine 144 "recent activity" may lead to an action 146, such as for example, playing an account balance to user 110. However, the same utterance 102 "I want to check my account balance" having the service tag 145 "balance" occurring within a second call 101 associated with a second self-service routine 144 "loan payment" may lead to a different action 146, such as for example, directing the user 110 to speaking with a representative.

As such, within the correlation table 141, system 100 identifies a self-service routine 144 and a service tag 145 that are associated with the utterance 102. Then, system 100 identifies an action 146 that correlates to the self-service routine 144 and the service tag 145. For example, system 100 may determine the self-service routine 144 "recent activity" and the service tag 145 "balance" that are associated with the utterance 102 "I want to check my account balance," and identify the corresponding action 146 in the correlation table 141 that will show or speak an account balance to user 110.

Users 110 comprise any suitable users including businesses or other commercial organizations, government agencies, and/or individuals. Users 110 may operate on one or more user devices 120 to access system 100.

User devices 120 comprise any suitable devices or machines configured to communicate with other network devices in the system 100. Typically, user device 120 is a data processing system comprising hardware and software that communicates with the other network elements over a network, such as the Internet, an intranet, an extranet, a private network, or any other medium or link. These data processing systems typically include one or more processors, an operating system, one or more applications, and one or more utilities. Applications running on the data processing systems provide native support for web protocols including, but not limited to, support for Hypertext Transfer Protocol (HTTP), Hypertext Markup Language (HTML), and Extensible Markup Language (XML), among others. Examples of user devices 120 include, but are not limited to, desktop computers, mobile phones, tablet computers, and laptop computers.

Network 130 includes any suitable networks operable to support communication between components of system 100. Network 130 may include any type of wired or wireless communication channel capable of coupling together computing nodes. Network 130 may include any interconnecting system capable of transmitting audio, video, electrical signals, optical signals, data, messages, or any combination of the preceding. Network 130 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100. Network 130 may be configured to support any communication protocols as would be appreciated by one of ordinary skill in the art upon viewing this disclosure.

Data store 140 of system 100 is generally configured to store correlation table 141, pre-defined responses 142, and pre-defined statistical language model 143, according to some embodiments of the present disclosure. Data store 140 includes any suitable storage scheme including any software, hardware, firmware, and/or combination thereof capable of storing information. Exemplary data store 140 includes individual data storage devices (e.g., memory, disks, solid-state drives), which may be part of individual storage engines and/or may be separate entities coupled to storage engines. Data store 140 may store third-party databases, database management systems, a file system, and/or other entities that include or that manage data repositories. Data store 140 may be locally located or remotely located to other components of system 100.

Figure 2:
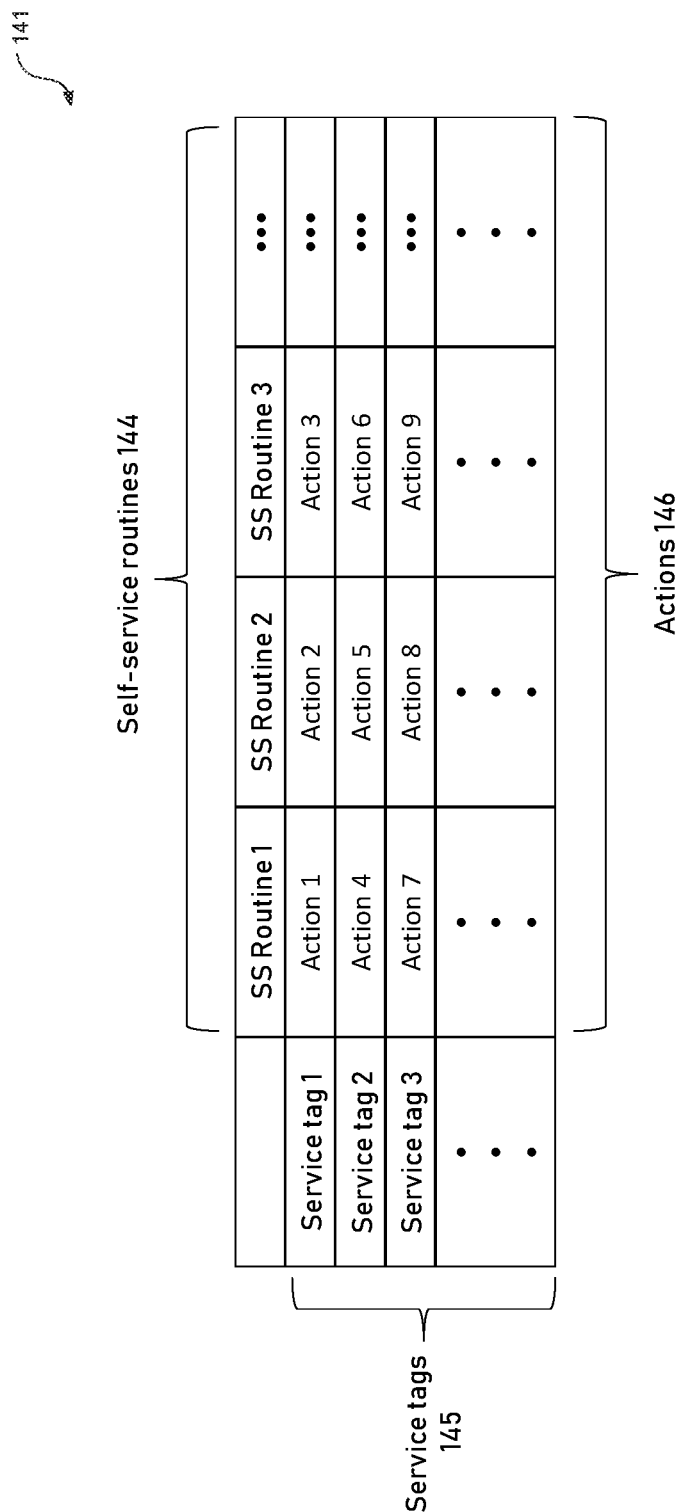
FIG. 2 illustrates an exemplary embodiment of a correlation table, according to the present disclosure.

Referring to FIG. 2, in some embodiments, correlation table 141 stored in data store 140 is configured with a set of self-service routines 144, a set of service tags 145, and a set of corresponding actions 146. Correlation table 142 is generally configured to store a correlation between the set of self-service routines 144, the set of service tags 145, and the set of corresponding actions 146. For example, each action 146 corresponds to a pair of a self-service routine 144 and a service tag 145. A self-service routine 144 is generally used as a descriptor to identify what the call 101 is for. Example self-service routines 144 include "recent activity" routine, "fraud claim" routine, "loan payment" routine, "fund transfer" routine, or "order access" routine. A service tag 145 is generally a descriptor to describe a service requested in utterance 102. Example service tags 145 include "balance," "bill," "claim," "new account," or "transfer." An action 146 comprises a service, an operation, or a process that system 100 conducts in response to an utterance 102 from a user 110. Example actions 146 include checking an account balance for user 110, performing a fund transaction for user 110, directing user 110 to a representative, or sending another query 103 to user 110. As noted before, each action 146 corresponds to a pair of a self-service routine 144 and a service tag 145. For example, as illustrated in FIG. 2, the action 146 "action 1" corresponds to the service tag 145

"service tag 1" and the self-service routine 144 "SS routine 1," and the action "action 2" corresponds to the service tag 145 "service tag 1" and the self-service routine 144 "SS routine 2." Note that, here, a service tag 145 leads to different actions 146 when correlating with different service routines 144. For example, the service tag 145 "service tag 1," when correlating with different self-service routines 144 "SS routine 1" and "SS routine 2," corresponds to different actions 146 "action 1" and "action 2."

This means that an utterance 102 having a service tag 145, when occurring within calls 101 associated with different self-service routines 144, may correspond to different actions 146. For example, an utterance 102 "I want to check my account balance" having the service tag 145 "balance" occurring within a first call 101 associated with a first self-service routine 144 "recent activity" may lead to an action 146, such as for example, playing an account balance to user 110. However, the same utterance 102 "I want to check my account balance" having the service tag 145 "balance" occurring within a second call 101 associated with a second self-service routine 144 "loan payment" may lead to a different action 146, such as for example, directing the user 110 to speaking with a representative.

Pre-defined response 142 stored in data store 140 comprises any set of pre-defined responses 142 associated with self-service routines 144. For calls 102 associated with different self-service routines 144, system 100 may identify different sets of pre-defined responses 142. For example, for a first call 101 associated with the self-service routine 144 "recent activity," system 100 may identify a first set of pre-defined responses 142 including the following options: "1. repeat," "2. new search," and "3. main menu." As another example, for a second call 101 associated with the self-service routine 144 "fraud claim," system 100 may identify a second set of pre-defined responses 142 including the following options: "1. dispute," "2. representative," and "3. main menu."

Statistical language model 143 includes any suitable statistical language models for performing natural language processing on utterance 102. Example statistical language models 143 include unigram model, n-gram model, exponential language model, or neural language model.

IVR engine 150 of system 100 is a special purpose computer to implement the algorithm discussed herein. Specifically, IVR engine 150 is configured to process calls 101 and utterances 102 that are sent from users 110 via network 130 using a special voice response processing technique. For example, IVR engine 150 may receive a call 101 from a user 110 operating on a user device 120. The call 101 may include a self-service request associated with a self-service routine 144, such as for example, for requesting recent activities for an account associated with the user 110. IVR engine 150 may associate the call 101 with the self-service routine 144, such as for example, "recent activity." In response to the call 101 associated with the self-service routine 144 "recent activity," IVR engine 150 may play the most recent five transactions associated with the account to the user 110. IVR engine 150 may further send a query 103 to user 110 to request subsequent instructions. For example, IVR engine 150 may send a query 103 to user 110 asking "What do you want to do next?" In response to the query 103, user 110 may send an utterance 102 to system 100. In one example, the utterance 102 may include a sentence saying "repeat" indicating that the user 110 wants to hear the recent activities again. As another example, the utterance 102 may include a sentence saying, "I want to check my account balance." Then, IVR engine 150 may compare the utterance 102 to a set of pre-defined responses 142 to see if there is a match. For example, the set of pre-defined responses 142 may include the following options: "1. repeat," "2. new search," and "3. main menu." If the utterance 102 matches one of the pre-defined responses 142, IVR engine 150 performs an action corresponding to the matching response 142. For example, if the utterance 102 is "repeat" and IVR engine 150 determines that it matches one of the pre-defined responses 142, IVR engine 150 plays (e.g., displays or speaks) the most recent five transaction again to user 110. If the utterance 102 does not match any one of the pre-defined responses 142, IVR engine 150 determines an occurrence of a failure state and proceeds to determine a meaning of the utterance 102. For example, if the utterance 102 is "I want to check my account balance" and IVR engine 150 determines that it does not match any one of the pre-defined responses 142, IVR engine 150 forwards the utterance 102 to NLP engine 160 for further analysis.

NLP engine 160 of system 100 is a special purpose computer to implement the algorithm discussed herein. Specifically, NLP engine 160 is configured to analyze utterances 102 using a special natural language processing technique. For example, NLP engine 160 may receive an utterance 102 from IVR engine 150 and analyze the utterance 102 with a pre-defined statistical language model 143. Statistical language model 143 includes any suitable statistical language models for performing natural language processing on utterance 102. Example statistical language models 143 include unigram model, n-gram model, exponential language model, or neural language model. NLP engine 160 may use the statistical language model 143 to analyze the language structure of the utterance 102 to identify keywords 162 of the utterance 102. For example, for the utterance 102 "I want to check my account balance" from user 110, NLP engine 160 may use statistical language model 143 to identify keywords 162 including a verb and infinitive combination of "want" and "to check" and an object "account balance." Based on the determined keywords 162, NLP engine 160 may then determine that user 110 wants to check account balance.

After identifying keywords 162, NLP engine 160 may generate a service tag 145 for the utterance 102 based on the keywords 162. Continuing with the above example, for the utterance 102 "I want to check my account balance," NLP engine 160 identifies keywords 162 "want," "to check," and "account balance" and generates a service tag 145 "balance" for utterance 102 based on the keywords 162. NLP engine 160 may further associate the utterance 102 with the service tag 145 "balance."

As noted before, IVR engine 150 previously associated the call 101 with a self-service routine 144, such as for example, "recent activity." Since utterance 102 is communicated within a context of the call 101, NLP engine 160 may further associate the utterance 102 with the self-service routine 144 "recent activity." Now, the utterance 102 is associated with both the self-service routine 144 "recent activity" and the service tag 145 "balance."

By associating the utterance 102 with the self-service routine 144 and the service tag 145, NLP engine 160 takes into account the context within which the call 101 and the utterance 102 occur. This allows system 100 to make a better decision on routing the call 101 or choosing a proper service or action 146 for the call 101 and the utterance 102. This can lead to fewer misrouted calls 101 and alleviate the bottleneck of the network 130.

NLP engine 160 then uses such association between the utterance 102, the self-service routine 144, and the service tag 145 to identify a corresponding action 146 in response to the utterance 102. Specifically, NLP engine 160 may use correlation table 141 to identify an action 146 in response to the utterance 102. Within the correlation table 141, NLP engine 160 identifies a self-service routine 144 and a service tag 145 that are associated with the utterance 102 and then identifies an action 146 that corresponds to the self-service routine 144 and the service tag 145. For example, NLP engine 160 may identify the self-service routine 144 "recent activity" and the service tag 145 "balance" in correlation table 141 that are associated with the utterance 102 "I want to check my account balance," and identify the corresponding action 146 in the correlation table 141 that will play an account balance to user 110.

An engine described in the present disclosure, such as querying engine 150, parsing engine 160, and authentication engine 170, may include hardware, software, or other engine(s). An engine may execute any suitable operating system such as, for example, IBM's zSeries/Operating System (z/OS), MS-DOS, PC-DOS, MAC-OS, WINDOWS, a .NET environment, UNIX, OpenVMS, or any other appropriate operating system, including future operating systems. The functions of an engine may be performed by any suitable combination of one or more engines or other elements at one or more locations.

A processor described in the present disclosure may comprise any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor may be a programmable logic device, a microcontroller, a microprocessor, or any suitable combination of the preceding. The processor may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

A memory described in the present disclosure, may comprise any device operable to store, either permanently or temporarily, data, operational software, or other information for a processor. In some embodiments, the memory comprises one or more disks, tape drives, or solid-state drives, and may be used as an over-flow data storage device, to store programs when such programs are selected for execution, and to store instructions and data that are read during program execution. The memory may comprise any one or a combination of volatile or non-volatile local or remote devices suitable for storing information. For example, the memory may comprise random access memory (RAM), read only memory (ROM), magnetic storage devices, optical storage devices, semiconductor storage devices, or any other suitable information storage device or a combination of these devices.

Figure 3:
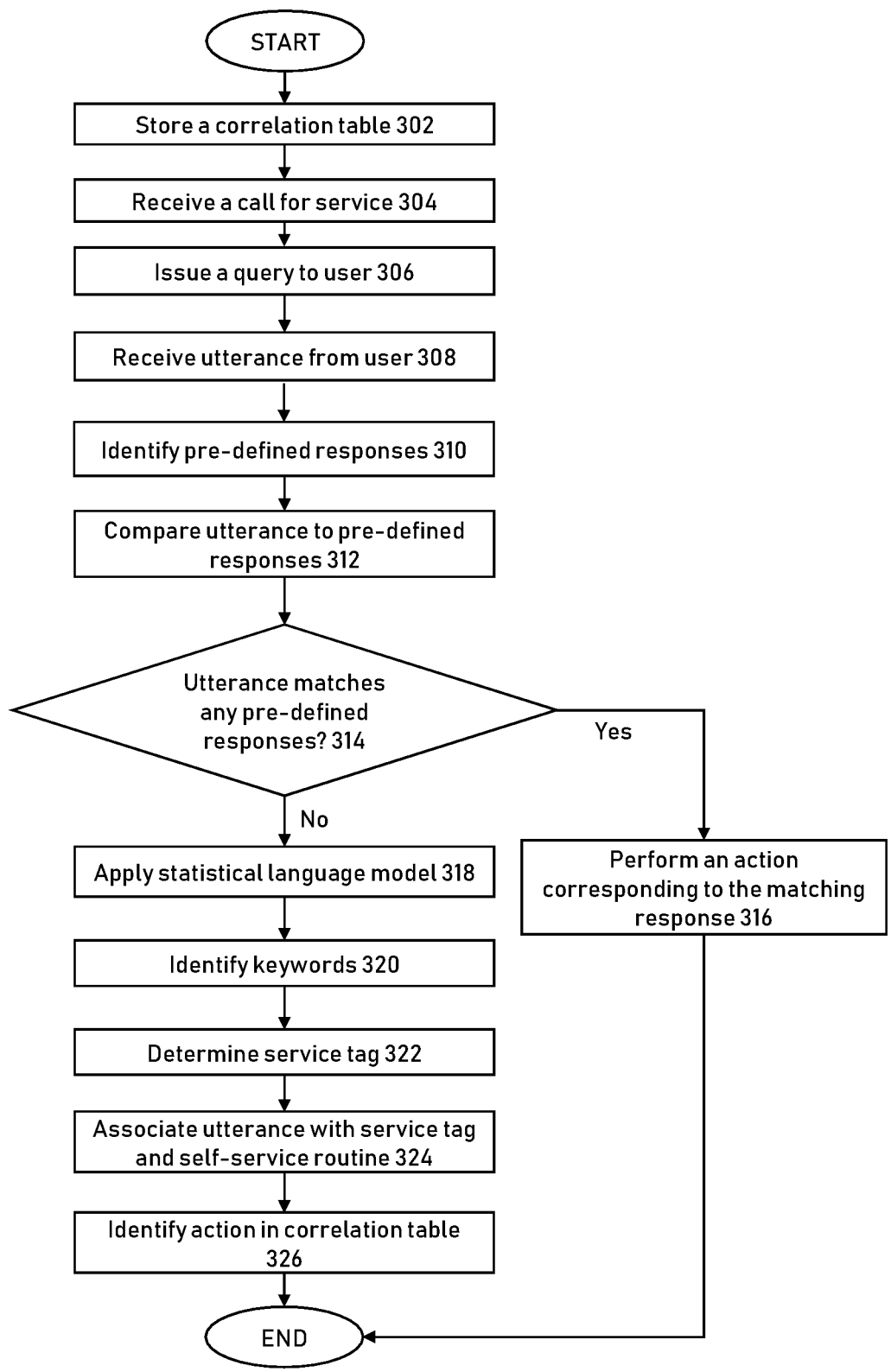
FIG. 3 illustrates a flow chart illustrating an exemplary embodiment of a method of processing voice responses, according to the present disclosure.

FIG. 3 presents a flow chart illustrating an exemplary embodiment of a method 300 of processing voice responses. The following is a non-limiting example that illustrates how system 100 implements method 300.

Upon starting the process, method 300 stores a correlation table 141 in data store 140 (step 302). Correlation table 141 is generally configured to store a correlation between a set of self-service routines 144, a set of service tags 145, and a set of corresponding actions 146. For example, each action 146 corresponds to a pair of a self-service routine 144 and a service tag 145. A self-service routine 144 is generally used as a descriptor to identify what the call 101 is for. A service tag 145 is generally a descriptor to describe a service requested in utterance 102. Note that a service tag 145, when correlating with different self-service routines 144, may correspond to different actions 146. For example, a service tag 145 correlating with a first self-service routine 144 may lead to a first action 146, while the service tag 145 correlating with a second self-service routine 144 may lead to a second action 146 that is different from the first action 146. This means that, an utterance 102 having a service tag 145, when occurring within calls 101 associated with different self-service routines 144, may lead to different actions 146. For example, an utterance 102 "I want to check my account balance" having the service tag 145 "balance" occurring within a first call 101 associated with a first self-service routine 144 "recent activity" may lead to an action 146, such as for example, playing (e.g., displaying or speaking) an account balance to user 110. However, the same utterance 102 "I want to check my account balance" having the service tag 145 "balance" occurring within a second call 101 associated with a second self-service routine 144 "loan payment" may lead to a different action 146, such as for example, directing the user 110 to speaking with a representative.

At step 304, method 300 receives a call 101 from user 110. Call 101 may include a self-service request associated with a self-service routine 144, such as for example, for requesting recent activities for an account associated with the user 110. System 100 may use a natural language processing technique to determine a few keywords 162 of the call 101. For example, system 100 may identify a keyword 162 "recent activity" and determines that the keyword 162 "recent activity" matches one of a set of self-service routines 144 stored in the system 100, such as for example, self-service routine 144 "recent activity." System 100 may associate the call 101 with the self-service routine 144 "recent activity." In response to the call 101 associated with the self-service routine 144 "recent activity," system 100 plays the most recent five transactions associated with the account to the user 110. System 100 may further expect subsequent instructions from user 110. For example, system 100 may want to know what user 110 wants to do next.

At step 306, method 300 sends a query 306 to user 110 for requesting subsequent instructions from user 110. For example, system 100 may send a query 103 to user 110 asking "What do you want to do next?" In response to the query 103, user 110 may return an utterance 102 to system 100.

At step 308, method 300 receives the utterance 102 from user 110. In one example, the utterance 102 may include a sentence saying "repeat" indicating that the user 110 wants to hear the recent activities again. As another example, the utterance 102 may include a sentence saying, "I want to check my account balance." System 100 may want to determine what the utterance 102 means. For example, system 100 may want to see whether the utterance 102 matches any of the pre-defined responses 142.

Execution proceeds to step 310 where method 300 identifies a set of pre-defined responses 142. In some embodiments, system 100 may identify a set of pre-defined responses specifically associated with the self-service routine 144 associated with the call 101. For example, a set of pre-defined responses 142 may include the following options: "1. repeat," "2. new search," and "3. main menu."

Note that each self-service routine 144 may be associated with a corresponding set of pre-defined responses 142 that are the same as or different from each other. After identifying a set of pre-defined responses 142 specifically associated with the self-service routine 144 associated with the call 101, method 300 proceeds to step 312.

At step 312, method 300 compares the utterance 102 to the set of pre-defined responses 142 as determined in step 310. For example, system 100 may use speech recognition techniques such as speech-to-text processing to convert the utterance 102 to a text form and use natural language processing and/or computational linguistics to systematically identify, extract, quantify, and study affective states and subjective information of the language in utterance 102. System 100 may extract keywords 162 of the utterance and compare the keywords 162 to each of the set of pre-defined responses 142 to see if there is a match.

At step 314, method 300 determines whether the utterance 102 matches any one of the set of pre-defined responses 142 as determined in step 310. If the utterance 102 matches one of the set of pre-defined responses 142, method 300 proceeds to step 316. If the utterance 102 does not match any one of the set of pre-defined responses 142, method 300 proceeds to step 318.

At step 316, method 300 performs an action corresponding the matching pre-defined response 142 in response to determining that the utterance 102 matches one of the set of pre-defined responses 142. For example, if the utterance 102 is "repeat" and system 100 determines that the it matches one of the pre-defined responses 142, system 100 plays the most recent five transaction again to user 110.

At step 318, method 300 analyzes the utterance 102 with a pre-defined statistical language model 143 in response to determining that the utterance 102 does not match any one of the set of pre-defined responses 142. System 100 may use the statistical language model 143 to analyze the language structure of the utterance 102. For example, for the utterance 102 "I want to check my account balance" from user 110, system 100 may use statistical language model 143 to identify a verb and infinitive combination of "want" and "to check" and an object "account balance."

At step 320, method 300 identifies one or more keywords 162 of the utterance 102. Continuing with the above example, for the utterance 102 "I want to check my account balance," system 100 identifies keywords 162 "want," "to check," and "account balance."

At step 322, method 300 determines a service tag 145 for the utterance 102 based on the keywords 162 as identified in step 320. For example, after identifying the keywords 162 "want," "to check," and "account balance," system 100 may generate a service tag 145 "balance" for utterance 102 based on the keywords 162. At step 324, method 300 associates the utterance 102 with the service tag 145 as determined in step 322. Method 300 may further associate the utterance 102 with the self-service routine 144 associated with the call 101 as determined in step 304.

For example, for an utterance 102 with a service tag 145 "balance" that occurs within a call 101 associated with the self-service routine 144 "recent activity," system 100 may associate the utterance 102 with both the service tag 145 "balance" and the self-service routine 144 "recent activity." At step 326, method 300 identifies an action 146 in the correlation table 141 that corresponds to the service tag 145 and the self-service routine 144 that are associated with the utterance 102. For example, system 100 may determine that the utterance 102 is associated with the service tag 145 "balance" and the self-service routine 144 "recent activity" and identify the service tag 145 "balance" and the self-service routine 144 "recent activity" in correlation table 141. System 100 then identify an action 146 in the correlation table 141 that corresponds to the service tag 145 "balance" and the self-service routine 144 "recent activity." For example, the action 146 may including playing an account balance to user 110.

Method 300 presents a process to effectively processing voice responses from users 110. For example, when encountering a no-match situation for the pre-defined responses 142, instead of asking the user 110 to provide another utterance 102 or response that matches one of the pre-defined responses 142, method 300 as disclosed in the present disclosure takes the user's response (e.g., the utterance 102) and analyzes it using a pre-defined statistical language model 143. With the statistical language model 143, the disclosed method 300 analyzes the language structure and grammar of the user's response to extract a few keywords 162. Based on the keywords 162, the method 300 understands what the user 110 wants to do and identify an action 146 (e.g., an operation, a service) in response to the user's response. In this way, the disclosed method 300 provides an efficient way to interpreting users' response utterance 102 and providing an action 146 accordingly as opposed to repeatedly asking the users 110 to provide a response that must match a pre-defined response 142. This helps conserve extra network resources (e.g., network bandwidth) that would otherwise be used for the system 100 to request user 110 provide one of the pre-defined response 142 and for the user 110 to respond with something that matches one of the pre-defined response 142. Therefore, the disclosed method 300 and system 100 facilitates reducing the strain in the network and removing the network bottleneck.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skill in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for processing voice responses, comprising:
a memory configured to store:
a plurality of self-service routines, a plurality of service tags, and a plurality of actions, each action correlating to a pair of a self-service routine and a service tag; and a plurality of pre-defined responses associated with the plurality of self-service routines, each self-service routine associated with a subset of the plurality of pre-defined responses;

an interactive voice response engine communicatively coupled to the memory and configured to receive a first utterance from the user in response to a query; and a natural language processing engine configured to:
analyze the first utterance with a pre-defined statistical language model;
identify one or more keywords of the first utterance based on the analysis;
determine a service tag of the first utterance based on the one or more keywords;
compare the service tag of the first utterance with each of the plurality of service tags;
in response to determining that the service tag of the first utterance matches a first service tag, associate the first utterance with the first service tag and the first self-service routine; and
identify a first action for the first utterance that correlates to the first service tag and the first self-service routine.

2. The system of claim 1, wherein the query comprises a first subset of the predefined responses.

3. The system of claim 1, wherein the interactive voice response engine is further configured to:
identify a first subset of the pre-defined responses;
compare the first utterance with each of the first subset of the pre-defined responses; and
in response to determining that the first utterance matches one of the first subset of the pre-defined responses, perform an action corresponding to the matching pre-defined response.

4. The system of claim 1, wherein the natural language processing engine is further configured to:
in response to receiving a second utterance, correlate the second utterance to the statistical language model;
identify one or more keywords of the second utterance based on the correlating;
determine a service tag of the second utterance based on the one or more keywords of the second utterance;
compare the service tag of the second utterance with each of the plurality of service tags;
in response to determining that the service tag of the second utterance also matches the first service tag, associate the second utterance with the first service tag and the second self-service routine; and
identify a second action for the first utterance that correlates to the first service tag and the second self-service routine.

5. The system of claim 1, wherein each of the plurality of self-service routines comprises one of the following:
a recent activity routine;
a fraud claim routine;
a loan payment routine;
a fund transfer routine; or
an order access routine.

6. The system of claim 1, wherein each of the plurality of service tags comprises one of the following:
balance;
bill;
claim;
new account; or
transfer.

7. The system of claim 1, wherein the statistical language model comprises at least one of the following:
a unigram model;
an n-gram model;
an exponential language model; or
a neural language model.

8. A non-transitory computer-readable medium comprising a logic for processing voice responses, the logic, when executed by one or more processors, instructing the one or more processors to:
store a plurality of self-service routines, a plurality of service tags, and a plurality of actions, each action correlating to a pair of a self-service routine and a service tag;
store a plurality of pre-defined responses associated with the plurality of self-service routines, each self-service routine associated with a subset of the plurality of pre-defined responses;
receive a first utterance from the user in response to a query;
analyze the first utterance with a pre-defined statistical language model;
identify one or more keywords of the first utterance based on the analysis;
determine a service tag of the first utterance based on the one or more keywords;
compare the service tag of the first utterance with each of the plurality of service tags;
in response to determining that the service tag of the first utterance matches a first service tag, associate the first utterance with the first service tag and the first self-service routine; and
identify a first action for the first utterance that correlates to the first service tag and the first self-service routine.

9. The non-transitory computer-readable medium of claim 8, wherein the query comprises a first subset of the pre-defined responses.

10. The non-transitory computer-readable medium of claim 8, wherein the logic, when executed by the one or more processors, further instructs the one or more processors to:
in response to determining that the first utterance matches one of the first subset of the pre-defined responses, perform an action corresponding to the matching pre-defined response.

11. The non-transitory computer-readable medium of claim 8, wherein the logic, when executed by the one or more processors, further instructs the one or more processors to:
in response to receiving a second utterance, correlate the second utterance to the statistical language model;
identify one or more keywords of the second utterance based on the correlating;
determine a service tag of the second utterance based on the one or more keywords of the second utterance;
compare the service tag of the second utterance with each of the plurality of service tags;
in response to determining that the service tag of the second utterance also matches the first service tag, associate the second utterance with the first service tag and the second self-service routine; and
identify a second action for the first utterance that correlates to the first service tag and the second self-service routine.

12. The non-transitory computer-readable medium of claim 8, wherein the statistical language model comprises at least one of the following:

a unigram model;
an n-gram model;
an exponential language model; or
a neural language model.

13. The non-transitory computer-readable medium of claim 8, wherein each of the plurality of self-service routines comprises one of the following:
a recent activity routine;
a fraud claim routine;
a loan payment routine;
a fund transfer routine; or
an order access routine.

14. A method for processing voice responses, comprising:
storing a plurality of self-service routines, a plurality of service tags, and a plurality of actions, each action correlating to a pair of a self-service routine and a service tag;
storing a plurality of pre-defined responses associated with the plurality of self-service routines, each self-service routine associated with a subset of the plurality of pre-defined responses;
receiving a first utterance from the user in response to a query;
analyzing the first utterance with a pre-defined statistical language model;
identifying one or more keywords of the first utterance based on the analysis;
determining a service tag of the first utterance based on the one or more keywords;
comparing the service tag of the first utterance with each of the plurality of service tags;
in response to determining that the service tag of the first utterance matches a first service tag, associating the first utterance with the first service tag and the first self-service routine; and
identifying a first action for the first utterance that correlates to the first service tag and the first self-service routine.

15. The method of claim 14, wherein the query comprises a first subset of the predefined responses.

16. The method of claim 14, wherein the method further comprises:
in response to determining that the first utterance matches one of the first subset of the pre-defined responses, performing an action corresponding to the matching pre-defined response.

17. The method of claim 14, wherein the method further comprises:
in response to receiving the second utterance, correlating the second utterance to the statistical language model;
identifying one or more keywords of the second utterance based on the correlating;
determining a service tag of the second utterance based on the one or more keywords of the second utterance;
comparing the service tag of the second utterance with each of the plurality of service tags;
in response to determining that the service tag of the second utterance also matches the first service tag, associating the second utterance with the first service tag and the second self-service routine; and
identifying a second action for the first utterance that correlates to the first service tag and the second self-service routine.

18. The method of claim 14, wherein the statistical language model comprises at least one of the following:
a unigram model;
an n-gram model;
an exponential language model; or
a neural language model.

19. The method of claim 14, wherein each of the plurality of self-service routines comprises one of the following:
a recent activity routine;
a fraud claim routine;
a loan payment routine;
a fund transfer routine; or
an order access routine.

20. The method of claim 14, wherein each of the plurality of service tags comprises one of the following:
balance;
bill;
claim;
new account; or
transfer.

* * * * *